(12) United States Patent
Apfel

(10) Patent No.: US 6,956,945 B2
(45) Date of Patent: Oct. 18, 2005

(54) METHOD AND APPARATUS FOR PHANTOM BATTERY FEED

(75) Inventor: Russell J. Apfel, Austin, TX (US)

(73) Assignee: Legerity, Inc., Austin, TX (US)

( * ) Notice: Subject to any disclaimer, the term of this patent is extended or adjusted under 35 U.S.C. 154(b) by 325 days.

(21) Appl. No.: 10/384,300

(22) Filed: Mar. 7, 2003

(65) Prior Publication Data

US 2004/0174993 A1 Sep. 9, 2004

(51) Int. Cl.[7] .................................................. H04M 1/00

(52) U.S. Cl. .............. 379/413; 379/395.01; 379/399.01

(58) Field of Search ........................ 379/395.01, 399.01, 379/413

(56) References Cited

U.S. PATENT DOCUMENTS 6,233,335 B1 * 5/2001 Ludeman .................... 379/413

* cited by examiner

Primary Examiner—Jeffery F. Harold
(74) Attorney, Agent, or Firm—Williams Morgan & Amerson, P.C.

(57) ABSTRACT

A method and apparatus is for providing a phantom battery feed to reduce power consumption in a differential amplifier circuit. A voltage signal is driven onto a telecommunications line using a first amplifier and a second amplifier. A phantom battery feed is performed during a negative cycle of the voltage signal. Performing the phantom battery feed comprises: supplying a negative supply terminal of the first amplifier with a supply voltage that is one-half of a full scale supply voltage; and supplying a positive supply terminal of the second amplifier with a supply voltage that is one-half of the full scale supply voltage.

26 Claims, 8 Drawing Sheets

METHOD AND APPARATUS FOR PHANTOM BATTERY FEED

BACKGROUND OF THE INVENTION

1. Field of the Invention

This invention relates generally to telecommunications, and, more particularly, to providing a phantom battery feed for power savings in amplifier circuits.

2. Description of the Related Art

In communications systems, particularly telephony such as a Plain Old Telephone System (POTS), it is common practice to transmit signals between a subscriber station and a central switching office via a two-wire, bi-directional communication channel. A line card generally connects the subscriber station to the central switching office. The functions of the line card include supplying talk battery, performing wake-up sequences of circuits to allow communications to take place, and the like. Voltage signals are processed and conditioned when being driven onto telecommunication lines.

POTS was designed primarily for voice communication, and thus provides an inadequate data transmission rate for many modern applications. To meet the demand for high-speed communication, designers have sought innovative and cost-effective solutions that would take advantage of the existing network infrastructure. Several technological solutions proposed in the telecommunications industry use the existing network of telephone wires. A promising one of these technologies is the Digital Subscriber Line (xDSL or DSL) technology.

xDSL is making the existing network of telephone lines more robust and versatile. Once considered virtually unusable for broadband communications, an ordinary twisted pair equipped with DSL interfaces can transmit video, television, and very high-speed data. The fact that more than six hundred million telephone lines exist around the world is a compelling reason for these lines to be used as the primary transmission conduits for at least several more decades. Because DSL utilizes telephone wiring already installed in virtually every home and business in the world, it has been embraced by many as one of the more promising and viable options.

There are now at least three popular versions of DSL technology, namely Asymmetrical Digital Subscriber Line (ADSL), Very High-Speed Digital Subscriber Line (VDSL), and Symmetric Digital Subscriber Line (SDSL). Although each technology is generally directed at different types of users, they all share certain characteristics. For example, all four DSL systems utilize the existing, ubiquitous telephone wiring infrastructure, deliver greater bandwidth, and operate by employing special digital signal processing. Because the aforementioned technologies are well known in the art, they will not be described in detail herein.

DSL and POTS technologies can co-exist in one line (e.g., also referred to as a "subscriber line"). Traditional analog voice band interfaces use the same frequency band, 0–4 Kilohertz (KHz), as telephone service, thereby preventing concurrent voice and data use. A DSL interface, on the other hand, operates at frequencies above the voice channels, from 25 KHz to 1.1 Megahertz (MHz). Thus, a single DSL line is capable of offering simultaneous channels for voice and data. It should be noted that the standards for certain derivatives of ADSL are still in definition as of this writing, and therefore are subject to change.

DSL systems use digital signal processing (DSP) to increase throughput and signal quality through common copper telephone wire. It provides a downstream data transfer rate from the DSL Point-of-Presence (POP) to the subscriber location at speeds of up to 1.5 mega-bits per second (MBPS). The transfer rate of 1.5 MBPS, for instance, is fifty times faster than a conventional 28.8 kilobits per second (KBPS).

DSL systems generally employ a signal detection system that monitors the telephone line for communication requests. More specifically, the line card in the central office polls the telephone line to detect any communication requests from a DSL data transceiver, such as a DSL modem, located at a subscriber station. There are multiple types of signals that are received and transmitted over multiple signal paths during telecommunication operation. Many times it is advantageous to transmit signals in a voltage format, such as to reduce transmission power consumption.

Many times, power consumption in the line card can be undesirably high. Amplifier circuits that are used to condition communication signals often consume large amounts of power. Excessive power use can compromise the effectiveness of line cards, particularly for remote line cards, which rely upon portable power supplies. Excessive power consumption can also require additional resources to counteract the effects of high power consumption, such as additional cooling systems to keep line card circuitry in operating condition. Excessive power consumption can also require additional circuits to furnish the required amounts of power needed for efficient operation of line cards.

The additional resources required to deal with excessive power consumption can cause signal problems in communications signals. More resources, such as more circuit elements, can cause noise and distortion in signals that are processed by the line card. Integrity of voice and/or data signals can be compromised, causing communications data corruption. Remote line card systems may require additional resources, such as more portable power supplies and related circuitry. Therefore, excessive power consumption can cause appreciable inefficiencies in the operation of line cards and the communication system as a whole.

The present invention is directed to overcoming, or at least reducing the effects of, one or more of the problems set forth above.

SUMMARY OF THE INVENTION

In one aspect of the present invention, a method is provided for a performing a phantom battery feed into a circuit. A voltage signal is driven onto a telecommunications line using a first amplifier and a second amplifier. A phantom battery feed is performed during a negative cycle of the voltage signal. Performing the phantom battery feed comprises: supplying a negative supply terminal of the first amplifier with a supply voltage that is one-half of a full scale supply voltage; and supplying a positive supply terminal of the second amplifier with a supply voltage that is one-half of the full scale supply voltage.

In another aspect of the present invention, an apparatus is provided for performing a phantom battery feed into a circuit. The apparatus of the present invention comprises: a first amplifier comprising a positive supply terminal and a negative supply terminal; a first switch coupled with said negative supply terminal of said first amplifier, said switch being adapted to transition said negative supply terminal from a full scale voltage source to a half scale voltage source; a second amplifier comprising a positive supply terminal and a negative supply terminal; and a second switch coupled with said positive supply terminal of said second amplifier, said switch being adapted to transition said positive supply terminal from a full scale voltage source to a half scale voltage source.

BRIEF DESCRIPTION OF THE DRAWINGS

The invention may be understood by reference to the following description taken in conjunction with the accompanying drawings, in which like reference numerals identify like elements, and in which.

Figure 1:
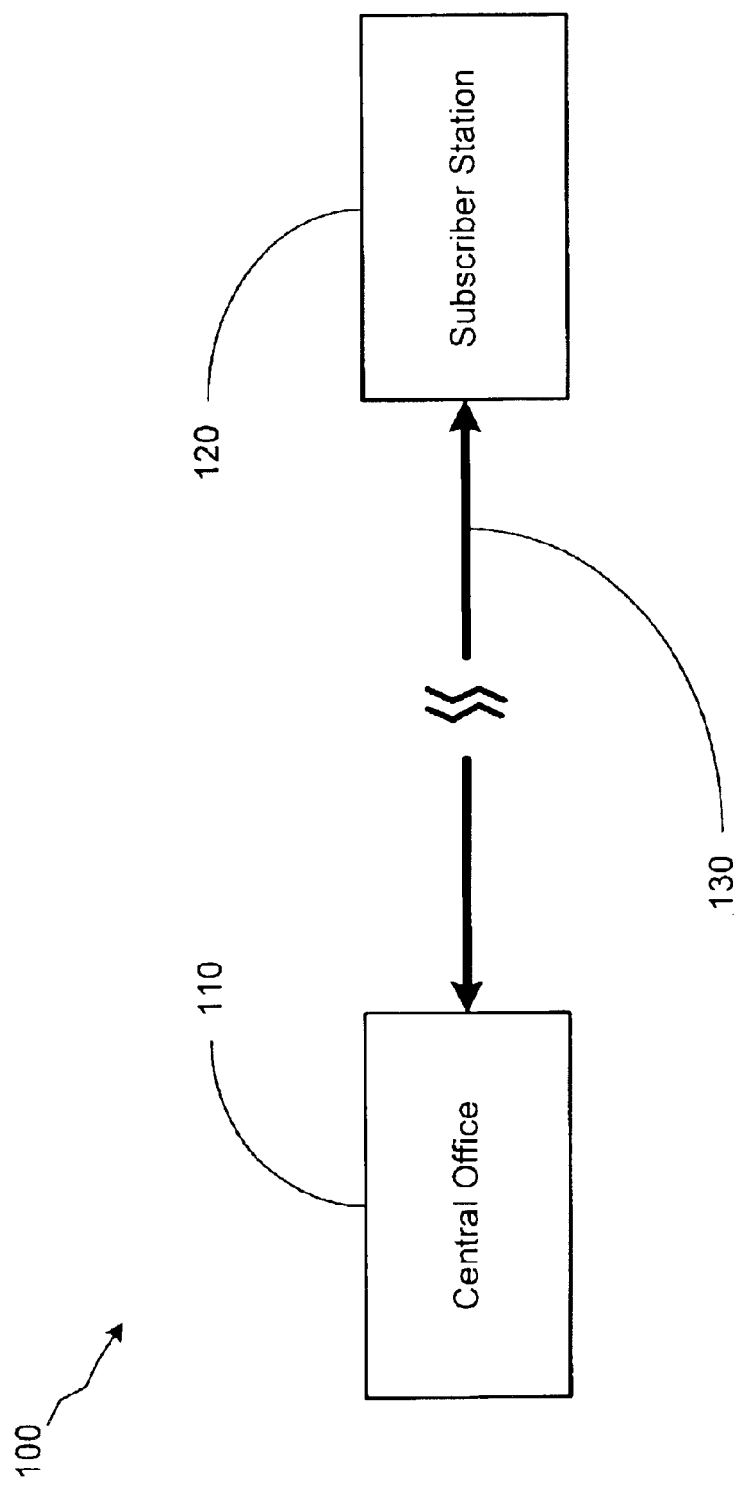
FIG. 1 illustrates a first embodiment of an apparatus in accordance with the present invention.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Embodiments of the present invention provide for a method and apparatus for reducing power consumption in an amplifier circuit used to condition a communications signal. Embodiments of the present invention also provide for employing a phantom battery feed to reduce power consumption in a circuit. Embodiments of the present invention provide for reducing power consumption in a differential amplifier circuit.

Referring now to the drawings, and in particular to FIG. 1, an apparatus 100 in accordance with the present invention is illustrated. The apparatus 100 includes a central office 110 that is coupled a subscriber station 120 via a subscriber line 130. The central office 110 and the subscriber station 120 are capable of sending and receiving a signal comprising voice and data band. The voice band, as used herein, refers to a POTS voice signal ranging from 0–4 KHz. The data band refers to frequencies above the voice band, and may include, for example, the frequency range employed in xDSL technologies. In one embodiment, the subscriber line 130 may be a Public Switched Telephone Network (PSTN) line, a Private Branch Exchange (PBX) line, or any other medium capable of transmitting signals.

The subscriber station 120 may be a telephonic device capable of supporting pulse dialing. The term "telephonic device," as utilized herein, includes a telephone, or any other device capable of providing a communication link between at least two users. In one embodiment, the subscriber station 120 may be one of a variety of available conventional telephones, such as wired telephones and similar devices. In an alternative embodiment, the subscriber station 120 may be any "device" capable of performing a substantially equivalent function of a conventional telephone, which may include, but is not limited to, transmitting and/or receiving voice and data signals. Examples of the subscriber station 120 include a data processing system (DPS) utilizing a modem to perform telephony, a television phone, a wireless local loop, a DPS working in conjunction with a telephone, Internet Protocol (IP) telephony, and the like. IP telephony is a general term for the technologies that use the Internet Protocol's packet-switched connections to exchange voice, fax, and other forms of information that have traditionally been carried over the dedicated circuit-switched connections of the public switched telephone network (PSTN). One example of IP telephony is an Internet Phone, a software program that runs on a DPS and simulates a conventional phone, allowing an end user to speak through a microphone and hear through DPS speakers. The calls travel over the Internet as packets of data on shared lines, avoiding the tolls of the PSTN.

Figure 2:
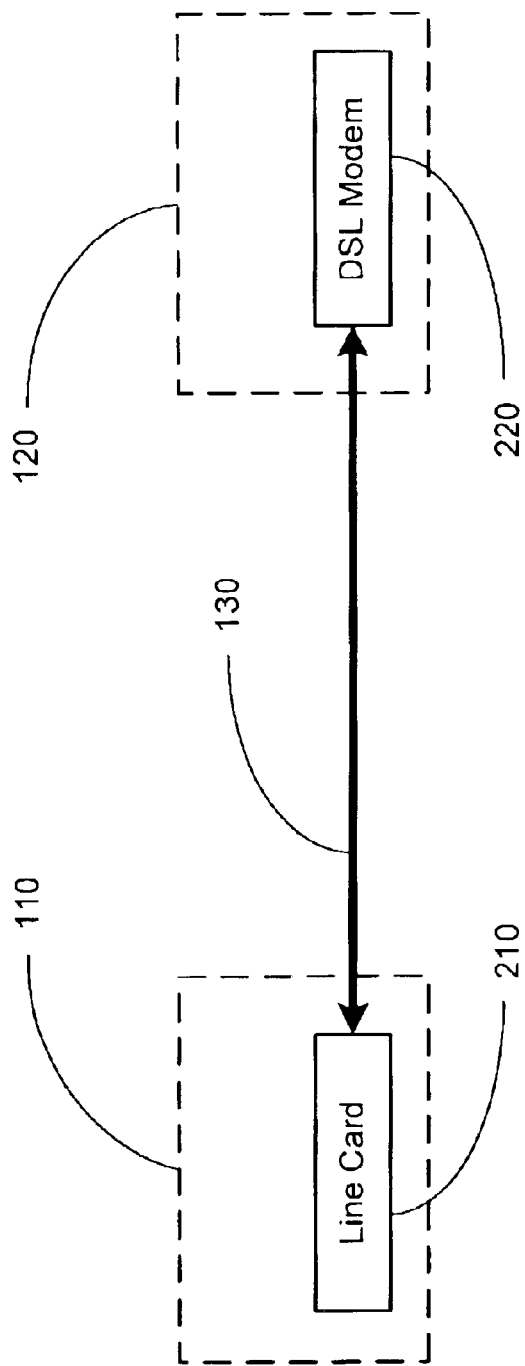
FIG. 2 illustrates an implementation of a line card into the apparatus described in FIG. 1.

Turning now to FIG. 2, a line card 210 and a DSL modem 220 are illustrated in accordance with the present invention. In one embodiment, the line card 210, which is integrated into the central office 110, is coupled with the DSL modem 220, which resides within the subscriber station 120. Because voice and/or data can be transmitted on the subscriber line 130, the signal received and transmitted by the line card 210 and the DSL modem 220 may include voice and data band frequencies.

The line card 210 may be located at a central office or a remote location somewhere between the central office and the subscriber station 120 (see FIG. 1). The line card 210 services the subscriber station 120, which in the illustrated embodiment is a telephonic device. The line card 210 is capable of processing DC voltage signals and AC signals. The subscriber line 130 in the instant embodiment is a telephone line. The combination of the telephone device 120 and the telephone line 130 is generally referred to as a subscriber loop.

The line card 210, which may be capable of supporting a plurality of subscriber lines 130, performs, among other things, two fundamental functions: DC loop supervision and DC feed. The purpose of DC feed is to supply enough power to operate the telephone device 120 at the customer end. The purpose of DC loop supervision is to detect changes in DC load, such as on-hook events, off-hook events, rotary dialing, or any other event that causes the DC load to change. In the interest of clarity and to avoid obscuring the invention, only that portion of the line card 210 that is helpful to the understanding of the invention is illustrated.

Figure 3:
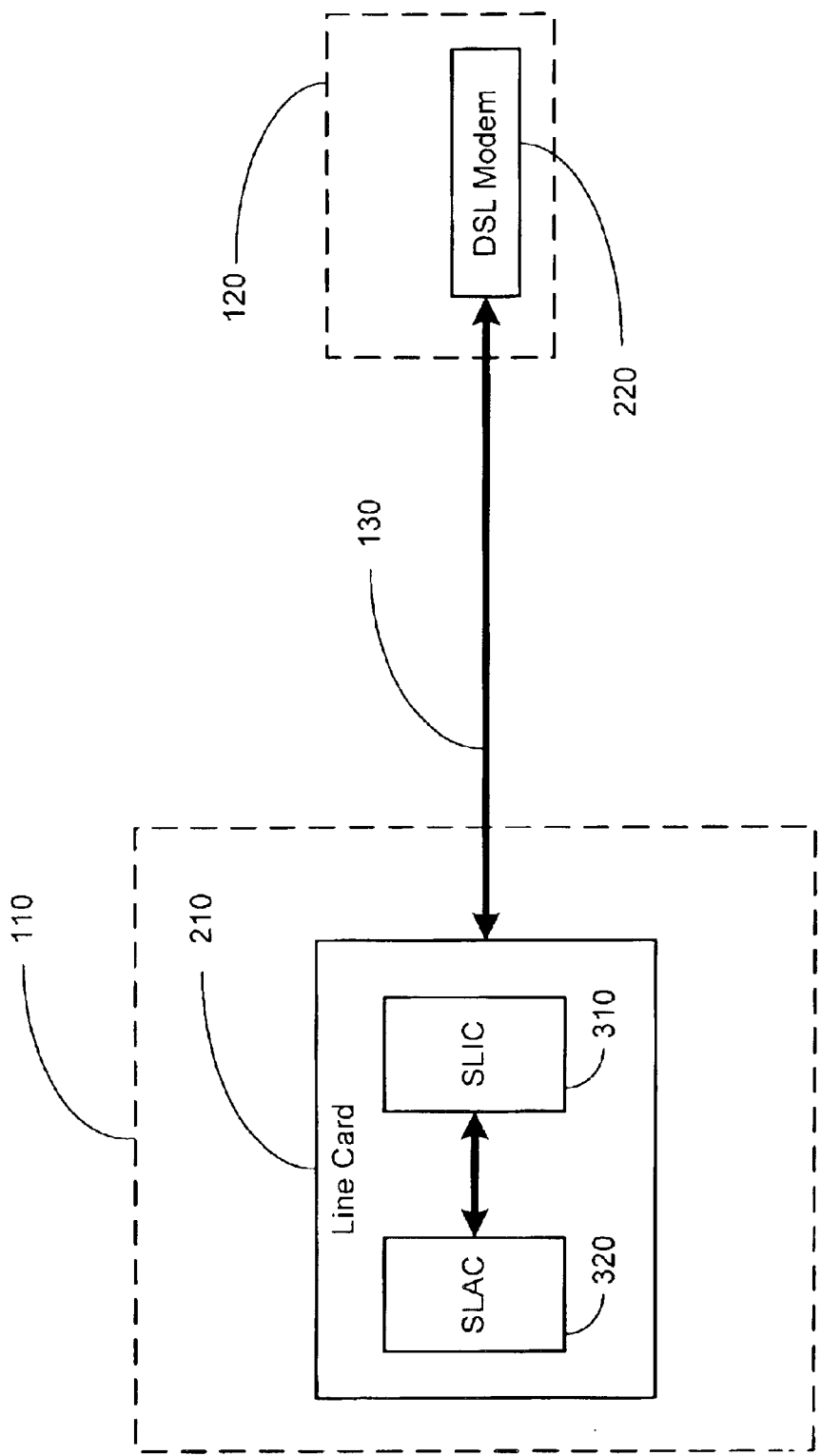
FIG. 3 illustrates a more detailed depiction of the line card in accordance with one embodiment of the present invention.

Turning now to FIG. 3, one embodiment of the line driver 210 is illustrated. In one embodiment, the line driver 210 comprises a subscriber line interface circuit (SLIC) 310 as well as a subscriber line audio-processing circuit (SLAC) 320. The SLIC 310 performs a variety of interface functions between the line driver 210 and the subscriber line 130. The SLIC 310 is also capable of performing a variety of functions, such as battery feed, overload protection, polarity reversal, on-hook transmission, and current limiting. The SLIC 310 is connected to the SLAC 320. The SLAC 320 is capable of processing analog-to-digital (A/D) and digital-to-analog (D/A) signal conversion, filtering, feed control, and supervision. In one embodiment, the phantom battery feed disclosed by embodiments of the present invention is provided in the SLIC 310.

Figure 4:
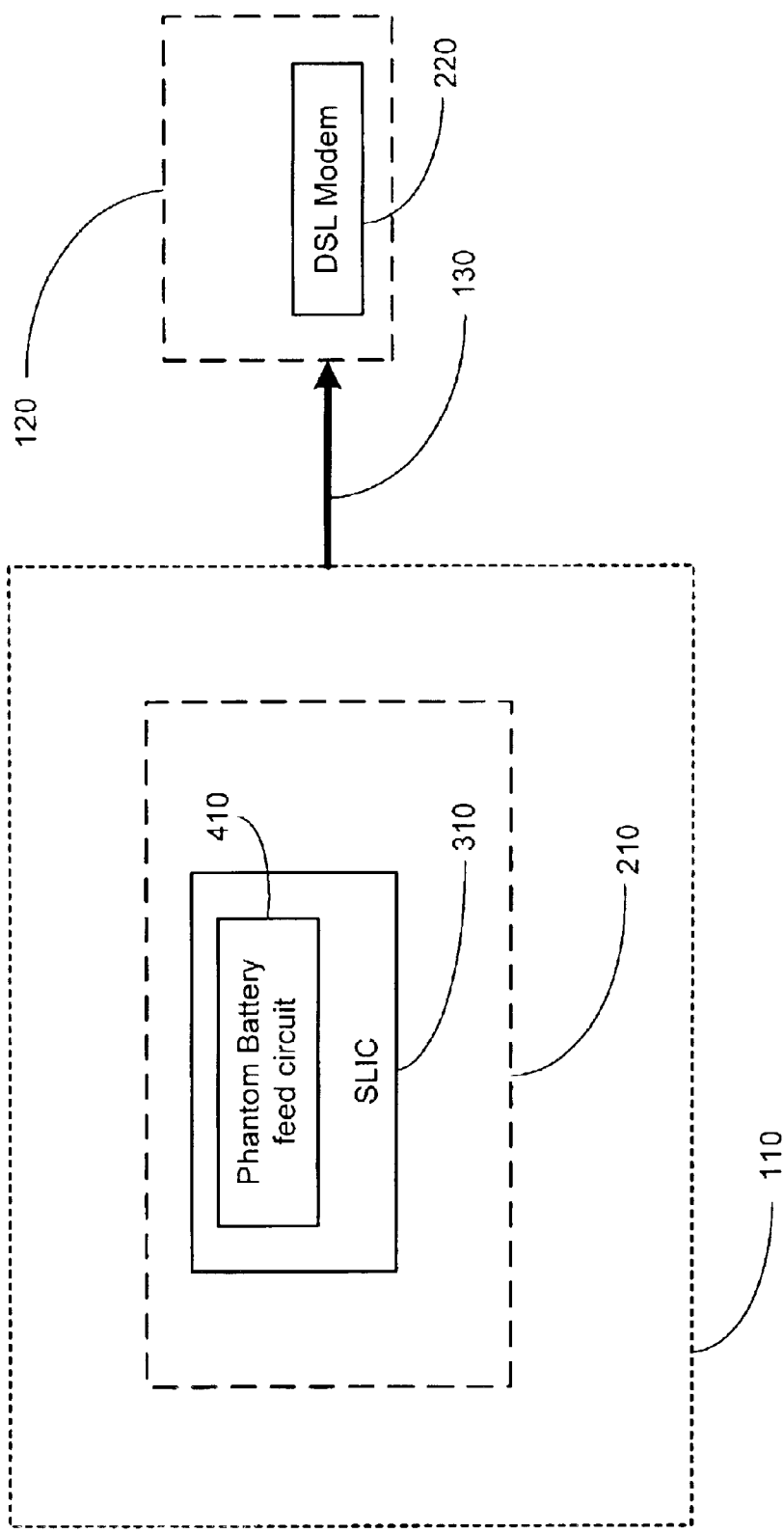
FIG. 4 illustrates a more detailed depiction of the SLIC, described in FIG. 3, in accordance with one embodiment of the present invention.

Turning now to FIG. 4, a more detailed description of the line driver 210 in accordance with one embodiment of the present invention is illustrated. In one embodiment, the SLIC 310 comprises a differential amplifier circuit, which is a circuit that is characterized by phantom battery feed circuit 410. The phantom battery feed circuit 410 is capable of reducing power consumption in a circuit that conditions a communication signal. The phantom battery feed circuit 410 is capable of reducing power consumption during certain portions of a signal cycle.

Figure 5:
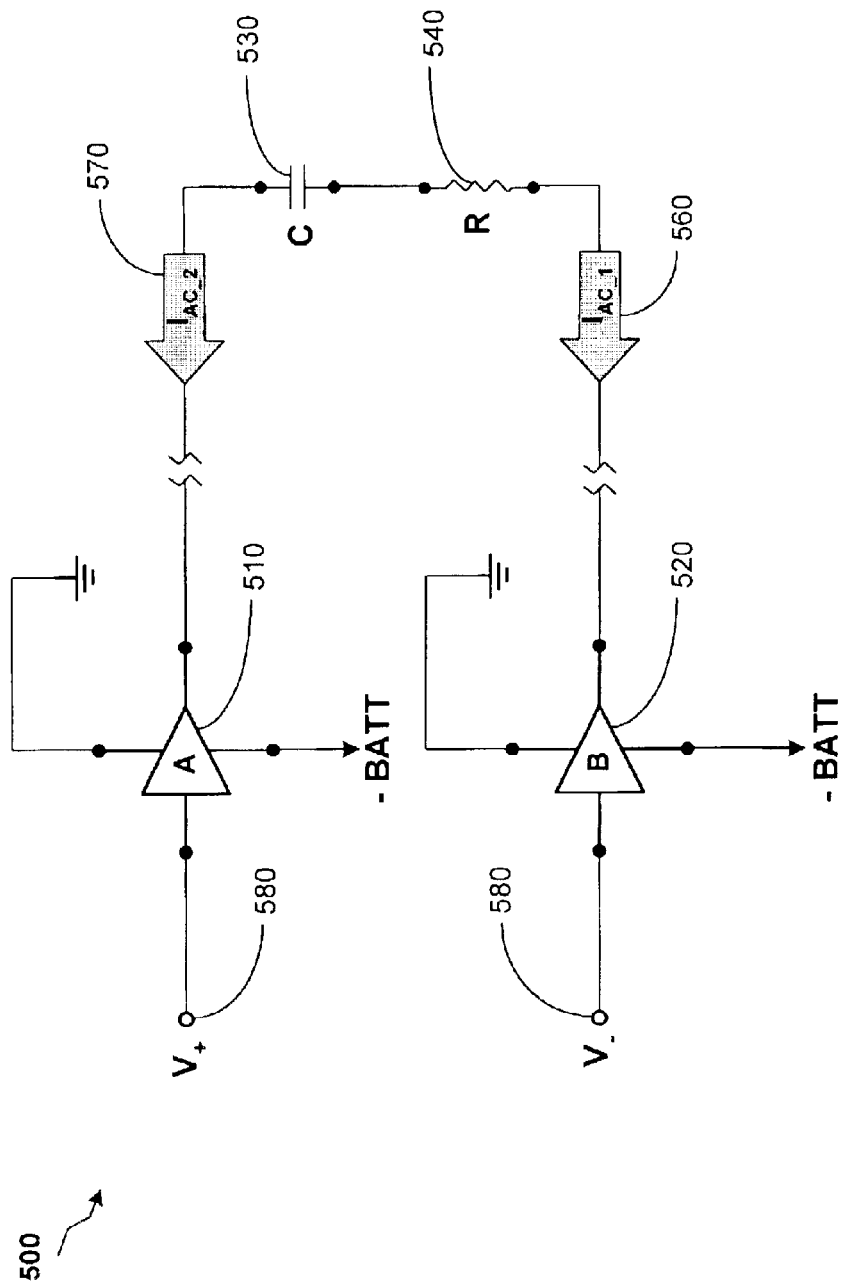
FIG. 5 illustrates a more detailed depiction of the SLIC, which comprises a circuit capable of conditioning a communications signal.

Turning now to FIG. 5, a circuit 500 for driving a voltage signal on the subscriber line 130, is illustrated. The circuit 500 comprises a differential amplifier circuit that is capable of conditioning a differential communication voltage signal 580. The circuit 500 shown in FIG. 5 comprises an amplifier-A 510, an amplifier-B 520, an equivalent circuit capacitance (C) 530, and an equivalent circuit resistance (R) 540. The circuit shown in FIG. 5, conditions the differential communications voltage signal 580, such that the voltage signal 580 can be driven on the subscriber line 130. The amplifier A 510 operates between the voltage-level defined by ground (GND) and a minus battery voltage (−BATT). The amplifier B 520 operates between GND and −BATT.

Figure 6:
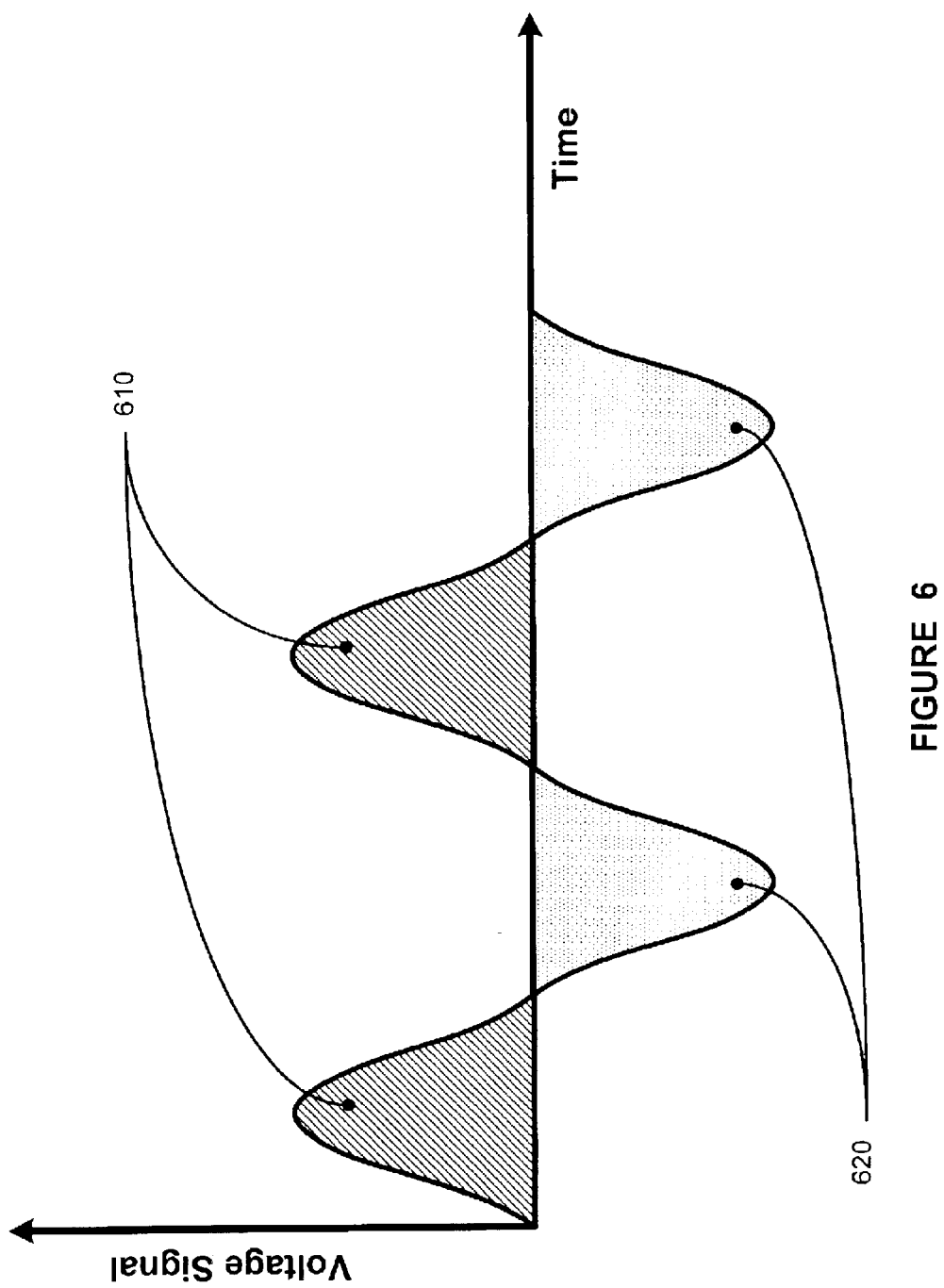
FIG. 6 depicts a graph that illustrates the communications signal that is conditioned by the circuit described in FIG. 6.

Turning now to FIG. 6, two cycles of the voltage signal 580 are illustrated. The voltage signal 580 experiences a positive cycle 610 and a negative cycle 620. Current in the circuit 500 flows in one direction during the positive cycle 610 of the voltage signal 580, and in the opposite direction during the negative cycle 620 of the voltage signal. Turning back to FIG. 5, during the positive cycle 610 of the voltage signal 580, an AC current ($I_{AC\_1}$) 560 is induced. During the negative cycle of the voltage signal 580, an AC current ($I_{AC2}$) 570 is induced.

For illustrative purposes, sample voltage, current, and battery values are used. However, the teachings of the present invention can be used for a variety of voltage, current, and battery values by those skilled in the art who have the benefit of the present disclosure.

The concept of a phantom battery feed taught by embodiments of the present invention is generally implemented when a DC offset between the amplifiers 510 and 520 that is greater than the AC swing of the voltage signal 580 is present. In the ADSL implementation of embodiments of the present invention, as well in the voice signals on the subscriber line 130, the DC offset between the amplifiers 510 and 520 is typically greater than the AC swings of the voltage signal 580. In the condition where a voice signal is on hook and data is active on the subscriber line 130, there is typically a 40 volt DC offset and the AC swings of the signal on the subscriber line 130 are approximately 34 volts. Circuit overhead in the line card 210 generally calls for approximately another 6 volts. Therefore, in one embodiment, the operational range of the amplifiers 510, 520 is set from ground (GND) to −82 volts (−BATT).

Assuming a −82 volt operational range, the amplifier-A 510 will be biased at −21 volts and the amplifier-B 520 will be biased at −61 volts. Generally, the average battery current is approximately equal to the average AC current ($I_{AC\_1}$ 560 and $I_{AC\_2}$ 570), which is approximately 31.6 milliamps plus the idle current of the line card 210 (7 milliamps) for a total current of approximately 38.6 milliamps. Therefore, the power dissipated in the load (C 530 and R 540) is approximately 170 milliwatts, thus, the remaining power (approximately 3 Watts), which can be excessive, is dissipated in the line card 210.

During the positive cycle 610 of the voltage signal 580, the power dissipation of the amplifier-A 510 is approximately 21 volts (i.e., the difference between the amplifier-A 510 output signal and the positive supply) multiplied by the AC current, $I_{AC\_1}$ 560. During the positive cycles 610, the power dissipation of the amplifier-B 520 output signal is approximately 21 volts (i.e., the difference between the amplifier-B 520 output and the negative supply) multiplied by the AC current, $I_{AC\_1}$ 560. Since the positive cycle 610 is half of the entire period of the voltage signal 580, the power dissipation calculations of the positive cycle 610 is valid for 50% of the operation time. During this half cycle (i.e., the positive cycle 610), the power dissipated in the amplifiers 510, 520 is approximately 42 volts multiplied by the value of the AC current, $I_{AC\_1}$ 560.

During the negative cycle 620 of the voltage signal, the power dissipation of the amplifier-A 510 is approximately 61 volts (i.e., the difference between the amplifier-A 520 output signal and the negative supply) multiplied by the AC current, $I_{AC\_2}$ 570. During the negative cycle 610, the power dissipation of the amplifier-B 520 is approximately 61 volts (i.e., the difference between the amplifier-B 520 output signal and the positive supply) multiplied by the AC current, $I_{AC\_2}$ 570. During this half cycle (i.e., the negative cycle 620), the power dissipated in the amplifiers 510, 520 is approximately 122 volts multiplied by the value of the AC current, $I_{AC\_2}$ 570. Since each cycle (i.e., the positive cycle 610 and the negative cycle 620) is true 50% of the time, the total power dissipation is (42 volts/2)+(121 volts/2) multiplied by $I_{AC}$ ($I_{AC}=I_{AC\_1}=-I_{AC\_2}$, for the circuit 500), which equal $*I_{AC}$.

Figure 7:
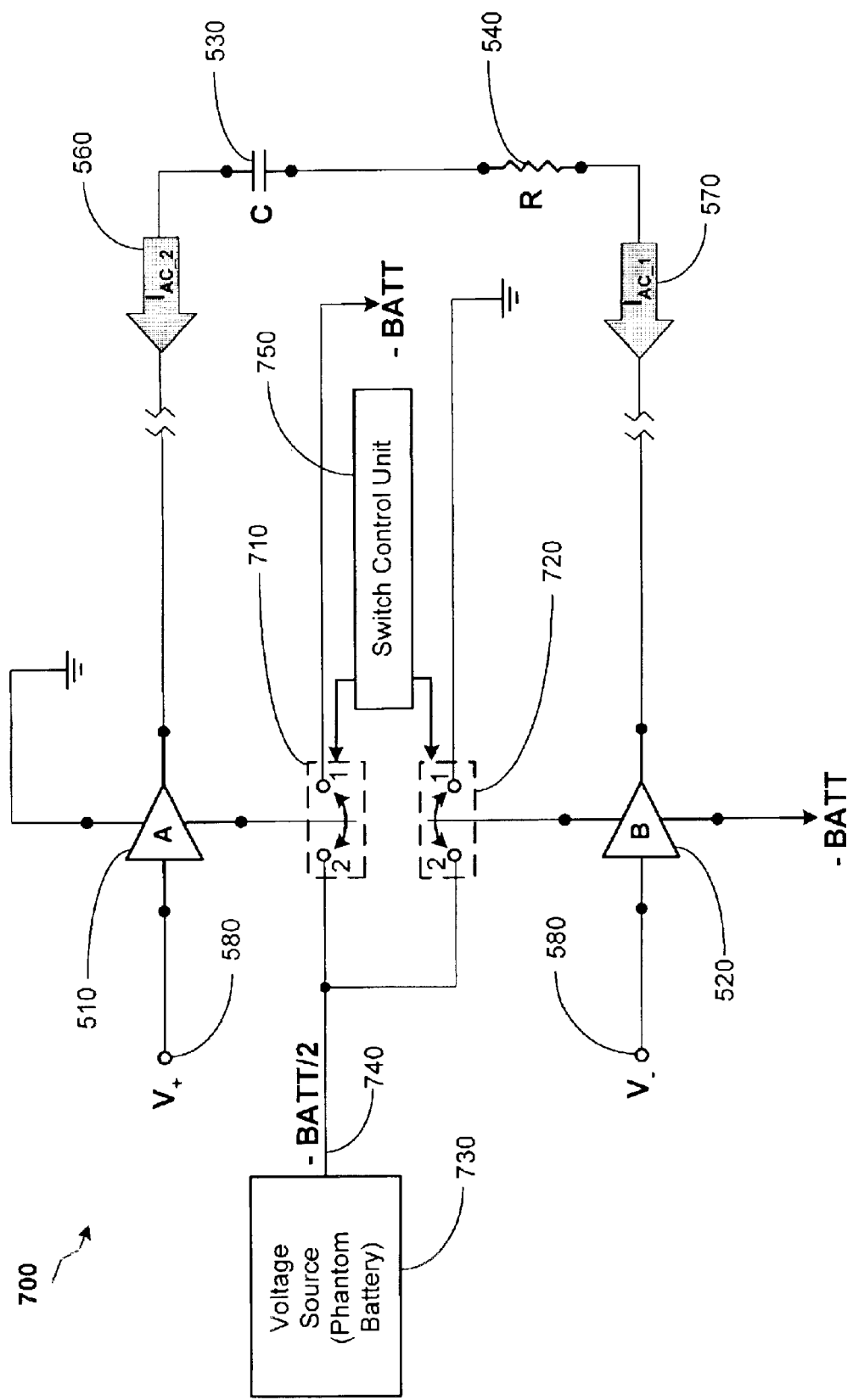
FIG. 7 illustrates a more detailed depiction of the SLIC which comprises a circuit that contains a phantom battery feed in accordance with one embodiment of the present invention, which is used to condition the communication signal described in FIG. 5.
Figure 8:
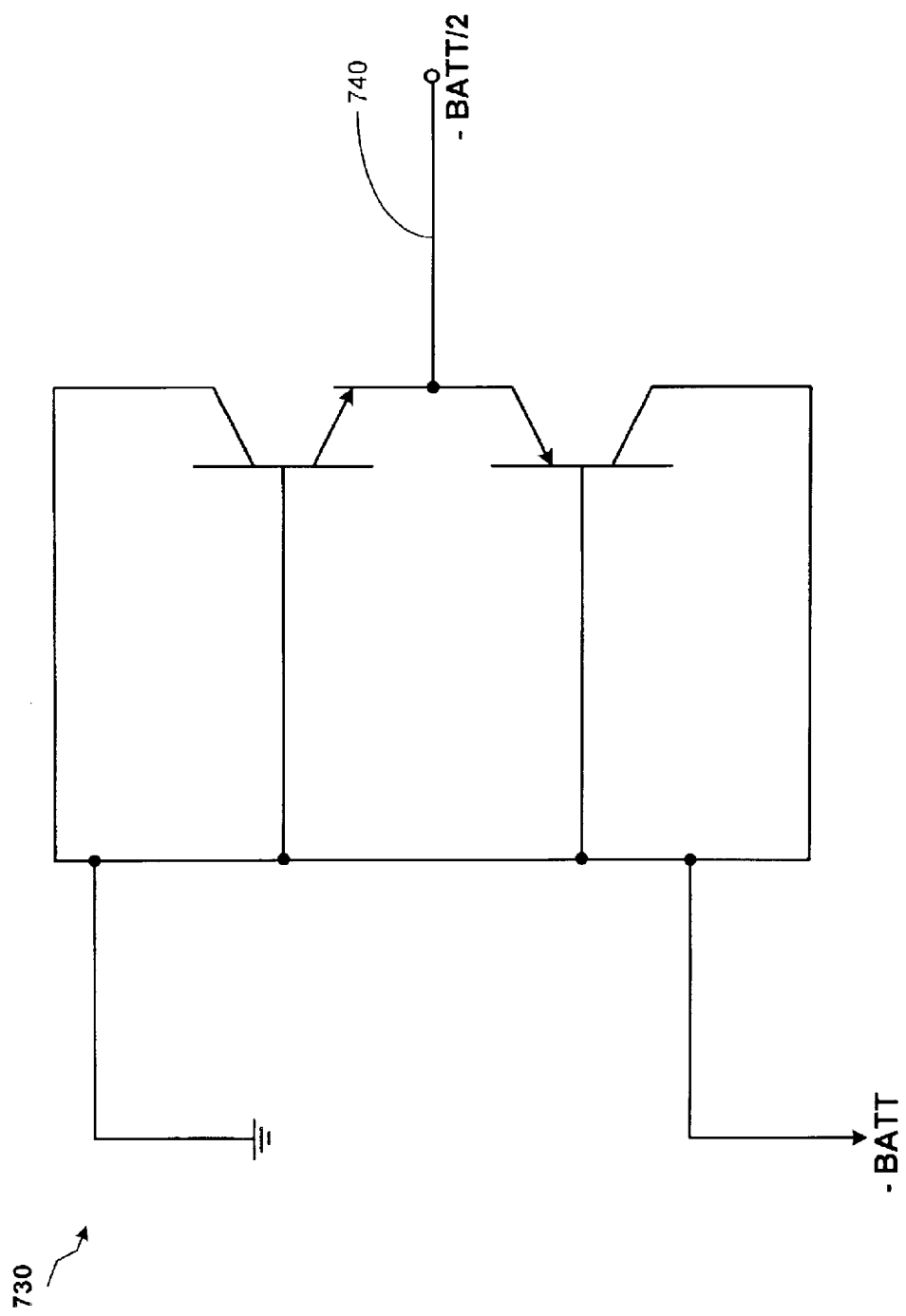
FIG. 8 illustrates one embodiment of a voltage supply utilized by the circuit described in FIG. 7.

Turning now to FIG. 7, one embodiment of a circuit 700 implementing a phantom battery feed, is illustrated. The circuit 700 comprises the amplifier-A 510, the amplifier-B 520, the capacitor C 530, the resistor R 540, a switch-A 710, a switch-B 720, a voltage source 730, and a switch control unit 750. The switches 710, 720 are connected to the voltage source 730, which can provide a voltage level of one-half the value of BATT (−BATT/2) on a line 740. In one embodiment, the voltage source 730 is a voltage regulator illustrated in FIG. 8.

Turning back to FIG. 7, the phantom battery feed circuit 700 provides a "phantom" battery (i.e., the voltage source 730) equal to −BATT/2, which is approximately equal to −41 volts in the illustrative example described above.

Using the switch 710, the negative supply of the amplifier-A 520 can be switched between −BATT and the output signal of the phantom battery (on the line 740), which has a voltage of −BATT/2. Using the switch 720, the positive supply of the amplifier-B 520 can be switched between GND and −BATT/ 2. In one embodiment, the switch control unit 750 can be used to control movement of the switches 710, 720, which allows for switching the amplifier supplies for improving efficiency. During the positive cycle 610, the switches 710 and 720 are activated to position 1 (i.e., normal operation). During the negative cycle 620, the switches 710 and 720 are activated to position 2 (i.e., phantom battery feed operation), which results in power savings.

When the switches 710, 720 are activated to position 2, the phantom battery replaces −BATT as the negative supply for the amplifier-A 510. The phantom battery also replaces GND as the positive supply for the amplifier-B 520. Since the operational voltages of the amplifiers 510, 520 are generally 20 volts away from their DC bias point, and the fact that only a 17 volt swing exists, the phantom battery provides adequate swing for each of the amplifiers 510 and 520.

During the positive cycle 610, the switches 710, 720 are activated into position 1 and the analysis of the circuit 700 is similar to the analysis of the circuit 500, which is described above. The power dissipated during the positive cycle 610 is approximately 42 volts multiplied by the AC current, $I_{AC\_1}$ (again multiplied by 50%, or $21*I_{AC\_1}$).

During the negative cycle, 620 the switches 710, 720 are activated to position 2, invoking the phantom battery operation mode. During the phantom battery operation mode, the power dissipated in the amplifier-A 510 is 21 volts multiplied by $I_{AC\_2}$ since the negative supply is now −41V. During the phantom battery operation, the power dissipated in the amplifier-B 520 is 21 volts multiplied by $I_{AC\_2}$ since the positive supply is also −41V. The total power dissipated during the negative cycle 620, while the switches 710, 720 are in position 2, is $[(42 \text{ volts})*I_{AC\_2}*50\%]$ (i.e., $21*I_{AC\_2}$). Therefore, the total power dissipated in the operation of the circuit 700 during the negative cycle 620 is $[(21*I_{AC\_1})+(21*I_{AC\_2})]$ The battery current during the positive cycle 610 is $I_{AC\_1}$. However, during the negative cycle 620, the switches are activated to position 2, invoking the phantom battery operation mode. During the phantom battery operation mode, the positive supply of amplifier-B 520 and the negative supply of the amplifier-A 510 are both −BATT/2, or −41 volts, therefore, the $I_{AC\_2}$ 570 is approximately zero. As illustrated above, the total power dissipated during the operation of the circuit 700 during the negative cycle 620 is $[(21*I_{AC\_2})+(21*I_{AC\_2})]$, but $I_{AC\_2}$ is now zero, therefore, the total power dissipation during the negative cycle is simply $21*I_{AC\_1}$. Furthermore, $I_{AC\_1}$ does not exist, as defined in FIG. 7, during the negative cycle 620, thus the total power dissipation during the negative cycle 620 is approximately zero. Using the concept of the phantom battery feed in circuit 700, the power dissipation during the operation of the circuit 700 is half of the power dissipation for the same period in circuit 500.

During the positive cycle 610, neither amplifier 510, 520 draws significant current from the phantom battery, therefore operating similarly to the circuit 500. However, during the negative cycle 620, each amplifier 710, 720 draws equal and opposite currents from the phantom battery, therefore, there is virtually zero current flow in or out of the phantom supply. In reality, some idling current from the amplifiers 710, 720 will flow in the phantom battery, however that current would have flowed through the −BATT power supply. The phantom battery effectively re-uses current during the negative half cycles due to the DC offset. The current reversals are overcome by the DC offset and capacitance of the line. The phantom battery feed apparatus and method illustrated in the present invention can be used in a variety of electronic circuitry by those skilled in the art.

The concepts taught by embodiments of the present invention can be utilized in a variety of electronic applications. The apparatuses 110, 120, 130 can be integrated in a system capable of transmitting and receiving signals having a voice band and a data band. The teachings of the present invention may be implemented in a line card 210 that supports both POTS and ADSL technologies.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed:

1. A method, comprising:
   driving a voltage signal onto a telecommunications line using a first amplifier and a second amplifier; and
   performing a phantom battery feed during a negative cycle of said voltage signal, performing said phantom battery feed comprising:
      supplying a negative supply terminal of said first amplifier with a supply voltage that is a portion of a full scale supply voltage; and
      supplying a positive supply terminal of said second amplifier with a supply voltage that is a portion of said full scale supply voltage.

2. The method of claim 1, further comprising dividing an operational voltage in half to create a phantom battery.

3. The method of claim 2, wherein supplying a negative supply terminal of said first amplifier with a supply voltage that is one-half of a full scale supply voltage further comprises switching said negative supply terminal from said full scale supply voltage to said phantom battery.

4. The method of claim 3, wherein switching said negative supply terminal comprises automatically switching said negative supply terminal in response to said voltage signal transitioning from a positive cycle to a negative cycle.

5. The method of claim 2, wherein supplying a positive supply terminal of said second amplifier with a supply voltage that is one-half of said full scale supply voltage further comprises switching said positive supply terminal from a ground terminal to said phantom battery.

6. The method of claim 3, wherein switching said positive supply terminal comprises automatically switching said positive supply terminal in response to said voltage signal transitioning from a positive cycle to a negative cycle.

7. An apparatus, comprising:
   a first amplifier comprising a positive supply terminal and a negative supply terminal;
   a first switch coupled with said negative supply terminal of said first amplifier, said switch being adapted to transition maid negative supply terminal from a full scale voltage source to a a portion of said voltage source;

a second amplifier comprising a positive supply terminal and a negative supply terminal and a second switch coupled with said positive supply terminal of said second amplifier, said switch being adapted to transition said positive supply terminal from a full scale voltage source to a a portion of said voltage source.

8. The apparatus of claim 7, further comprising a voltage source coupled to said first and second amplifier through at least one switch, the voltage source being capable of producing a half scale voltage supply.

9. The apparatus of claim 8, wherein said voltage source is a linear regulator capable of producing said half scale voltage signal.

10. The apparatus of claim 7, further comprising a switch control unit to perform automatic switching of said positive supply terminal and said negative supply terminal.

11. An apparatus, comprising:

a subscriber line; and a line card electronically coupled with said subscriber line said line card to:

drive a voltage signal onto said subscriber line using a first amplifier and a second amplifier;

supply a negative supply terminal of said first amplifier with a supply voltage that is a portion of a full scale supply voltage; and supply a positive supply terminal of said second amplifier with a supply voltage that is a portion of said full scale supply voltage.

12. The apparatus of claim 11, further comprising at lest one switch, said switch being adapted to transition at least one of said negative supply terminal and said positive supply terminal to a one-half supply.

13. The apparatus of claim 11, further comprising a switch control unit, said switch control unit to activate said switch to transition from a normal operation mode to a phantom battery operation mode in response to said voltage signal entering a negative cycle.

14. The apparatus of claim 11, wherein said subscriber line is a telephonic line.

15. The apparatus of claim 11, wherein said line card is housed in a central office.

16. An apparatus, comprising:

means for driving a voltage signal onto a telecommunications line using a first amplifier and a second amplifier; and means for performing a phantom battery feed during a negative cycle of said voltage signal, performing said phantom battery feed comprising:

supplying a negative supply terminal of said first amplifier with a supply voltage that is a full scale supply voltage; and supplying a positive supply terminal of said second amplifier with a supply voltage that is a portion of said full scale supply voltage.

17. A computer readable program storage device encoded with instructions that, when executed by a computer, performs a method, comprising:

driving a voltage signal onto a telecommunications line using a first amplifier and a second amplifier; and performing a phantom battery feed during a negative cycle of said voltage signal, performing said phantom battery feed comprising:

supplying a negative supply terminal of said first amplifier with a supply voltage that is a portion of a full scale supply voltage; and supplying a positive supply terminal of said second amplifier with a supply voltage that is a portion of said full scale supply voltage.

18. The computer readable program storage device encoded with instructions that, when executed by a computer, performs the method of claim 17, further comprising dividing an operational voltage in half to create a phantom battery.

19. The computer readable program storage device encoded with instructions that, when executed by a computer, performs the method of claim 18, wherein supplying a negative supply terminal of said first amplifier with a supply voltage that is one-half of a full scale supply voltage further comprises switching said negative supply terminal from said full scale supply voltage to said phantom battery.

20. The computer readable program storage device encoded with instructions that, when executed by a computer, performs the method of claim 19, wherein switching said negative supply terminal comprises automatically switching said negative supply terminal in response to said voltage signal transitioning from a positive cycle to a negative cycle.

21. The computer readable program storage device encoded with instructions that, when executed by a computer, performs the method of claim 18, wherein supplying a positive supply terminal of said second amplifier with a supply voltage that is one-half of said full scale supply voltage further comprises switching said positive supply terminal from a ground terminal to said phantom battery.

22. The computer readable program storage device encoded with instructions that, when executed by a computer, performs the method of claim 19, wherein switching said positive supply terminal comprises automatically switching said positive supply terminal in response to said voltage signal transitioning from a positive cycle to a negative cycle.

23. A method, comprising:

driving a signal onto a telecommunications line using a first amplifier and a second amplifier;

supplying a first supply terminal of said first amplifier with a supply voltage that is less than a full scale supply voltage during a first cycle of said voltage signal; and supplying a second supply terminal of said second amplifier with a supply voltage that is less than said full scale supply voltage during said first cycle of said voltage signal.

24. The method of claim 23, further comprising supplying a full scale supply voltage to said first and second supply terminal during a second cycle of said voltage signal.

25. The method of claim 1, wherein supplying said negative supply terminal of said first amplifier with a supply voltage that a portion of a full scale supply voltage comprises supplying said negative supply terminal a supply voltage that is one-half of a fall scale supply voltage.

26. The method of claim 1, wherein supplying said positive supply terminal of said second amplifier with a supply voltage that a portion of a full scale supply voltage comprises supplying said positive supply terminal a supply voltage that is one-half of a full scale supply voltage.

* * * * *

UNITED STATES PATENT AND TRADEMARK OFFICE
CERTIFICATE OF CORRECTION

PATENT NO.    : 6,956,945 B2
DATED         : October 18, 2005
INVENTOR(S)   : Russell J. Apfel It is certified that error appears in the above-identified patent and that said Letters Patent is hereby corrected as shown below:

Column 8,
Line 65, change "maid" to -- said --.
Line 66, delete duplicate "a".

Column 9,
Line 6, delete duplicate "a".

Column 9,
Line 21, add -- being capable -- after "card".
Line 31, change "lest" to -- least --.
Line 52, add -- portion of a -- after "that is a".

Signed and Sealed this

Twenty-first Day of February, 2006

JON W. DUDAS
*Director of the United States Patent and Trademark Office*